(12) United States Patent
Park

(10) Patent No.: US 11,772,555 B2
(45) Date of Patent: Oct. 3, 2023

(54) VEHICLE AND METHOD OF PROVIDING SURROUNDING INFORMATION THEREOF

(71) Applicants: HYUNDAI MOTOR COMPANY, Seoul (KR); KIA MOTORS CORPORATION, Seoul (KR)

(72) Inventor: GiWon Park, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 331 days.

(21) Appl. No.: 17/008,010

(22) Filed: Aug. 31, 2020

(65) Prior Publication Data
US 2021/0103743 A1 Apr. 8, 2021

(30) Foreign Application Priority Data
Oct. 7, 2019 (KR) .................. 10-2019-0123630

(51) Int. Cl.
*B60R 1/00* (2022.01)
*B60R 1/12* (2006.01)
(Continued)

(52) U.S. Cl.
CPC ............. *B60R 1/00* (2013.01); *B60R 1/12* (2013.01); *B60R 1/27* (2022.01); *B60R 11/04* (2013.01);
(Continued)

(58) Field of Classification Search
CPC ............. B60W 2552/50; B60W 40/02; B60W 2554/801; B60W 2554/802; B60W 2556/35; B60W 30/0956; B60W 30/18036; B60W 50/14; B60W 30/06; B60W 2050/143; B60W 2050/146; B60W 2420/42; B60W 2420/54; B60W 2554/20; B60R 21/0134; B60R 1/00; B60R 1/12; B60R 1/27; B60R 11/04; B60R 2001/1253; B60R 2300/105; B60R 2300/301; B60R 2300/303; B60R 2300/308; B60R 2300/806; B60R 2300/8093;
(Continued)

(56) References Cited

U.S. PATENT DOCUMENTS 7,663,502 B2 * 2/2010 Breed .................... B60N 2/829
340/7.29
9,507,346 B1 * 11/2016 Levinson ............. G05D 1/0291
(Continued)

FOREIGN PATENT DOCUMENTS

EP 2792529 B1 * 10/2019 ............. B60K 35/00
GB 2572006 * 3/2018 ............. B60W 50/00

*Primary Examiner* — Philip P. Dang
(74) *Attorney, Agent, or Firm* — Slater Matsil, LLP

(57) ABSTRACT

A method of providing surrounding information of a vehicle includes: detecting at least one sensor-based obstacle using sensor detection information acquired through a surroundings sensor, detecting at least one image-based obstacle using image information acquired through a plurality of cameras, detecting at least one matched obstacle from the at least one sensor-based obstacle or the at least one image-based obstacle, and correcting the position of the at least one matched obstacle using at least one of a sensor-based detection result or an image-based detection result with respect to the at least one matched obstacle.

15 Claims, 7 Drawing Sheets

(51) Int. Cl.
  *B60R 11/04* (2006.01)
  *G06T 7/13* (2017.01)
  *G06T 7/73* (2017.01)
  *G06V 20/58* (2022.01)
  *B60R 1/27* (2022.01)
  *G06V 10/25* (2022.01)
  *G06V 10/80* (2022.01)

(52) U.S. Cl.
  CPC ................. *G06T 7/13* (2017.01); *G06T 7/74* (2017.01); *G06V 10/25* (2022.01); *G06V 10/811* (2022.01); *G06V 20/58* (2022.01); *B60R 2001/1253* (2013.01); *B60R 2300/105* (2013.01); *B60R 2300/301* (2013.01); *B60R 2300/303* (2013.01); *B60R 2300/308* (2013.01); *B60R 2300/806* (2013.01); *B60R 2300/8093* (2013.01); *G06T 2207/30241* (2013.01); *G06T 2207/30261* (2013.01); *G06T 2207/30264* (2013.01)

(58) Field of Classification Search
  CPC .......... B60R 2300/307; B60Y 2302/03; B60K 2370/173; B60K 2370/176; B60K 2370/177; B60K 2370/178; B60K 2370/179; B60K 2370/186; B60K 2370/188; B60K 2370/191; B60K 2370/193; G06T 2207/30241; G06T 2207/30261; G06T 2207/30264; G06T 7/13; G06T 7/74; G06V 20/58; G06V 10/255; G06V 10/25; G06V 10/811; G06K 9/6293
  See application file for complete search history.

(56) References Cited

U.S. PATENT DOCUMENTS

| | | | | |
|---|---|---|---|---|
| 9,711,050 | B2* | 7/2017 | Ansari | G08G 1/162 |
| 9,734,455 | B2* | 8/2017 | Levinson | G06V 20/58 |
| 9,754,490 | B2* | 9/2017 | Kentley | G05D 1/0088 |
| 9,836,056 | B2* | 12/2017 | Ansari | G06T 17/00 |
| 9,884,631 | B2* | 2/2018 | James | B60W 40/08 |
| 10,065,557 | B2* | 9/2018 | Imaishi | B60Q 1/535 |
| 10,286,842 | B2* | 5/2019 | Penilla | G06Q 30/00 |
| 10,328,851 | B2* | 6/2019 | You | G06V 20/56 |
| 10,372,130 | B1* | 8/2019 | Kaushansky | B60W 50/14 |
| 10,460,182 | B1* | 10/2019 | Park | G06V 40/25 |
| 10,571,280 | B2* | 2/2020 | Pratt | G01S 7/412 |
| 10,609,148 | B1* | 3/2020 | Tran | B60W 40/09 |
| 10,768,620 | B1* | 9/2020 | Tran | A61B 5/6802 |
| 10,783,559 | B1* | 9/2020 | Tran | G09F 9/00 |
| 11,067,993 | B2* | 7/2021 | Gali | B60W 10/20 |
| 11,106,218 | B2* | 8/2021 | Levinson | G05D 1/0297 |
| 11,119,477 | B1* | 9/2021 | Konrardy | B60W 30/12 |
| 11,150,665 | B2* | 10/2021 | Tran | B60W 30/18163 |
| 11,200,433 | B2* | 12/2021 | Berberian | G06T 7/74 |
| 11,208,129 | B2* | 12/2021 | Kumar | G06V 20/52 |
| 11,267,401 | B2* | 3/2022 | Krishnamurthi | B60Q 9/00 |
| 11,277,957 | B2* | 3/2022 | Bertucci | G06F 16/29 |
| 11,301,767 | B2* | 4/2022 | Levinson | B60W 40/04 |
| 2013/0163879 | A1* | 6/2013 | Katz | G06T 7/254 382/195 |
| 2016/0357187 | A1* | 12/2016 | Ansari | G06T 19/003 |
| 2019/0187883 | A1* | 6/2019 | Lee | B60W 50/14 |
| 2021/0089048 | A1* | 3/2021 | Tran | B60R 25/257 |
| 2021/0207977 | A1* | 7/2021 | Lee | G06V 20/588 |

* cited by examiner

VEHICLE AND METHOD OF PROVIDING SURROUNDING INFORMATION THEREOF

CROSS-REFERENCE TO RELATED APPLICATION

This application claims priority to and the benefit of Korean Patent Application No. 10-2019-0123630, filed on Oct. 7, 2019, the entire contents of which are incorporated herein by reference.

FIELD

The present disclosure relates to a vehicle and a method of providing surrounding information thereof, and more particularly to a vehicle and a method of providing surrounding information thereof for providing a surrounding image as well as obstacle information.

BACKGROUND

The statements in this section merely provide background information related to the present disclosure and may not constitute prior art.

Conventionally, vehicles are equipped with a rear ultrasonic sensor or a rear camera to detect surrounding obstacles. Recently developed vehicles are equipped not only with a front ultrasonic sensor but also with an around view monitor (AVM) or a surround view monitor (SVM) for enabling an occupant to provide a real-time omnidirectional image.

When the capability to sense a collision with objects around a vehicle is universalized, an increasing number of drivers will come to depend on collision prevention warning sounds and omnidirectional images. The fundamental function of a device for sensing obstacles around a vehicle is to prevent a collision between obstacles and a vehicle body. Therefore, in many cases, an obstacle-sensing device is not capable of sensing a collision involving a part protruding from a vehicle body, e.g. a side mirror. Thus, when a driver parks a vehicle using only an obstacle-sensing device without paying special attention, collisions such as, for example, a collision of a side mirror with a pillar, frequently occur, with consequent damage. This will be described with reference to FIGS. 1A-1C.

FIGS. 1A, 1B and 1C are views showing the occurrence of a collision involving a side mirror of a general vehicle.

Referring to FIG. 1A, when the gear shift range of a vehicle 10 is the R-range, a rear ultrasonic sensor is activated. When a pillar 20, which is located in a lateral rearward space of the vehicle, falls within a sensing range 30 of the rear ultrasonic sensor, a warning sound is generated, and thus a driver may easily perceive the presence of the pillar 20.

In the case in which the vehicle 10 is equipped with an SVM system, a vehicle peripheral image 40 may be output through a display provided in the vehicle, as shown in FIG. 1B. Referring to FIG. 1B, a top view 10' of the vehicle is displayed in the middle of the image, and a view of the surroundings of the vehicle, including a view 20' of the pillar, is displayed as an omnidirectional image. In addition, an estimated travel trajectory 50 of the vehicle in response to the steering angle thereof may be further displayed in the vehicle peripheral image 40.

However, we have found that in such a general vehicle, when an obstacle is out of the sensing range of the ultrasonic sensor, a warning sound related thereto is not output. Although the SVM system provides the estimated travel trajectory 50 of the vehicle, the SVM system generates the estimated travel trajectory 50 on the basis of the vehicle body, but does not consider any other part protruding from the vehicle body. For example, as shown in FIG. 1C, an estimated trajectory 60 of a side mirror, which protrudes laterally from the vehicle body, is not provided. Therefore, although a driver drives the vehicle using the estimated travel trajectory 50 provided by the SVM system so as to avoid a collision between the vehicle body and the pillar 20, there frequently occurs a collision of the side mirror with the pillar 20.

In particular, in the case in which the side mirror is equipped with a side repeater or a camera for an SVM system, the repair cost thereof is very high. Further, in many cases of recently developed vehicles, it is difficult to replace a side mirror alone, and it is required to replace an assembly of components including the side mirror, which increases the economic burden on the vehicle owner.

SUMMARY

The present disclosure provides a vehicle and a method of providing surrounding information thereof for more effectively providing a driver with information about surrounding obstacles.

However, the objects to be accomplished by the forms are not limited to the above-mentioned object, and other objects not mentioned will be clearly understood by those skilled in the art to which the following exemplary forms pertain.

In one form of the present disclosure, a method of providing surrounding information of a vehicle may include: detecting at least one sensor-based obstacle using sensor detection information acquired through a surroundings sensor, detecting at least one image-based obstacle using image information acquired through a plurality of cameras, detecting at least one matched obstacle from the at least one sensor-based obstacle and the at least one image-based obstacle, and correcting the position of the at least one matched obstacle using at least one of a sensor-based detection result or an image-based detection result with respect to the at least one matched obstacle.

A vehicle according to one form of the present disclosure may include an input unit including a surroundings sensor and a plurality of cameras, a controller configured to detect and track at least one surrounding obstacle based on information acquired through the input unit, and an output unit configured to output guide information in response to a distance to the at least one surrounding obstacle detected and tracked by the controller. The controller may include an obstacle detector configured to detect at least one sensor-based obstacle using sensor detection information acquired through the surroundings sensor and to detect at least one image-based obstacle using image information acquired through the plurality of cameras, and an obstacle matching/correcting unit configured to detect at least one matched obstacle from the at least one sensor-based obstacle and the at least one image-based obstacle and to correct the position of the at least one matched obstacle using at least one of a sensor-based detection result or an image-based detection result with respect to the at least one matched obstacle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figures 4A, 4B:
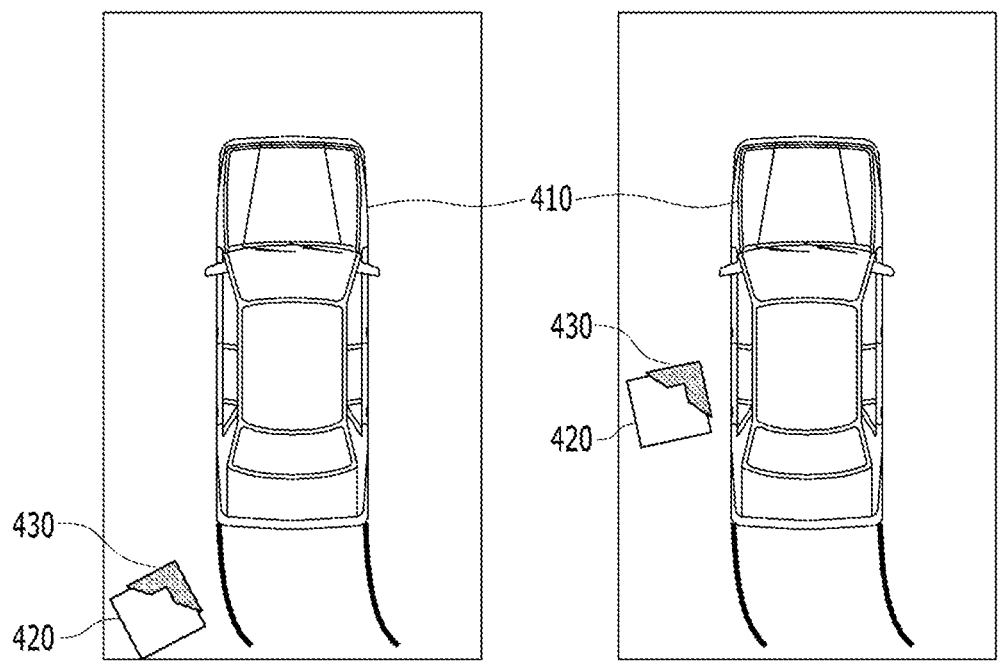
Figure 5:
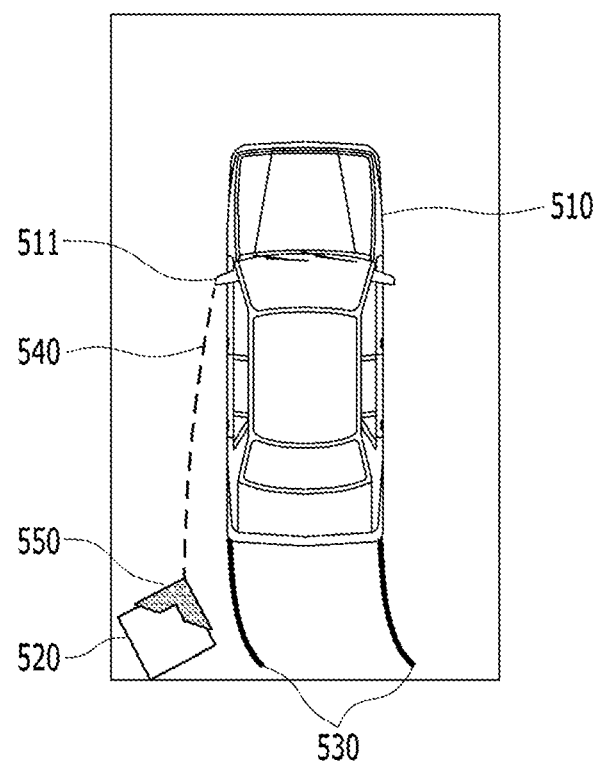
Figure 6A:
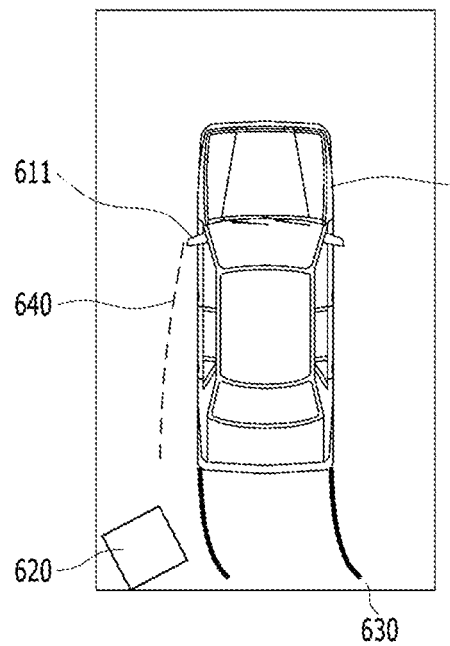
Figure 6B:
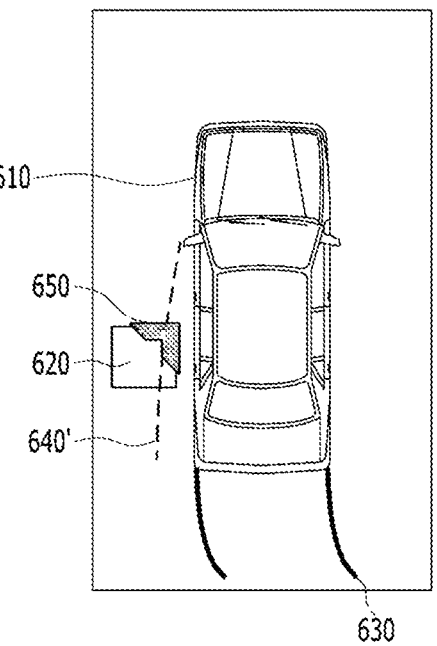
Figure 6C:
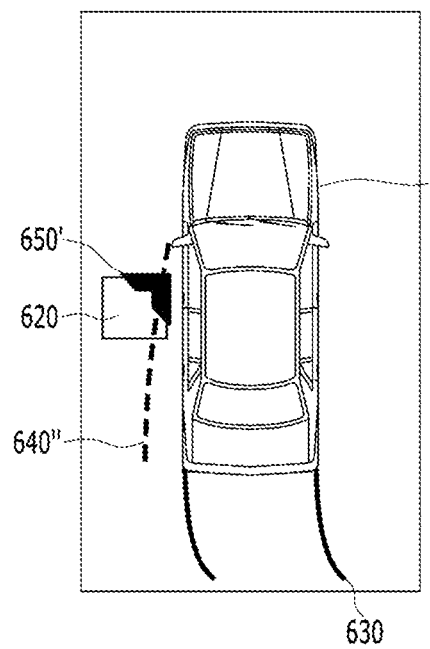
Figure 6D:
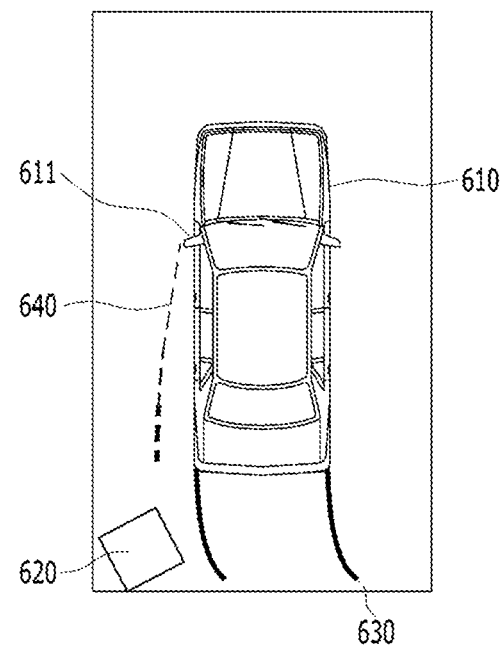
Figure 7A:
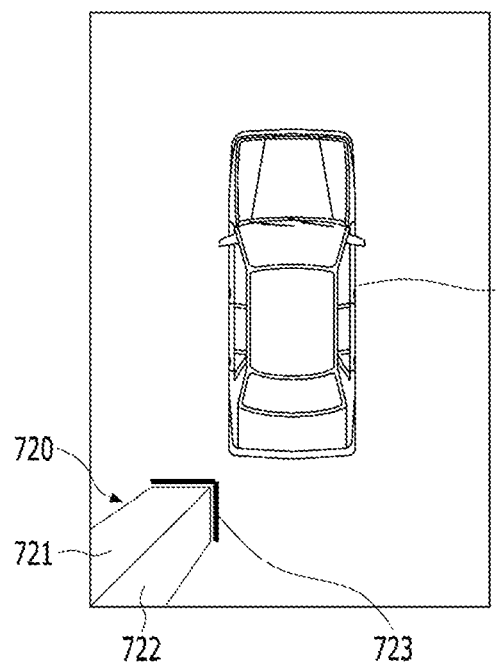
Figure 7B:
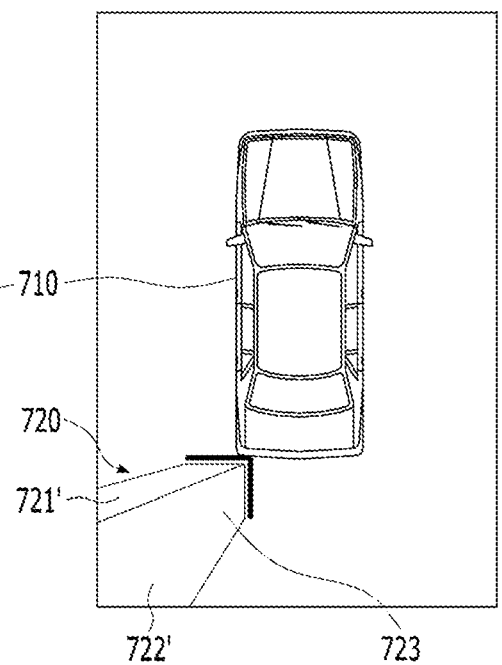

FIGS. 4A and 4B respectively show an exemplary output form of a guide image in one form of the present disclosure;

FIG. 5 shows another exemplary output form of a guide image in another form of the present disclosure;

FIGS. 6A, 6B, 6C and 6D respectively show exemplary output forms of a guide image in some forms of the present disclosure; and FIGS. 7A and 7B are views showing a pillar sensing principle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, forms of the present disclosure will be described in detail with reference to the accompanying drawings so that those skilled in the art may easily carry out the forms. The present disclosure may, however, be embodied in many different forms, and should not be construed as being limited to the forms set forth herein. In the drawings, parts irrelevant to the description of the present disclosure will be omitted for clarity.

Throughout the specification, when a certain part "includes" or "comprises" a certain component, this indicates that other components are not excluded and may be further included unless otherwise noted. The same reference numerals used throughout the specification refer to the same constituent elements.

According to exemplary forms of the present disclosure, the position of an obstacle around a vehicle is detected through an omnidirectional image and a sensor, and the position of the obstacle detected through the omnidirectional image and the position of the obstacle detected through the sensor are matched with each other so as to be corrected. Further, when the omnidirectional image is displayed, an image guide that takes into consideration a trajectory of an exterior part protruding from the vehicle body is provided during travel of the vehicle.

Figure 1C:
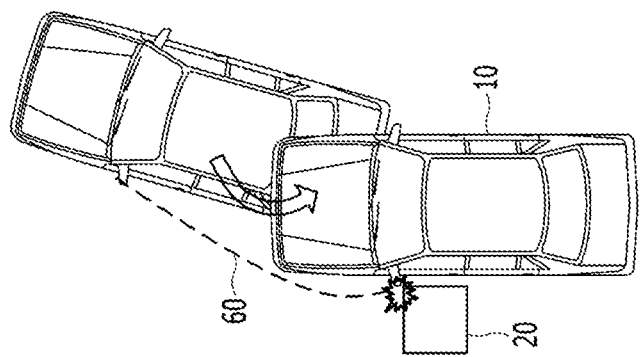
FIGS. 1A, 1B and 1C are views showing the occurrence of a collision involving a side mirror of a general vehicle.
Figure 1B:
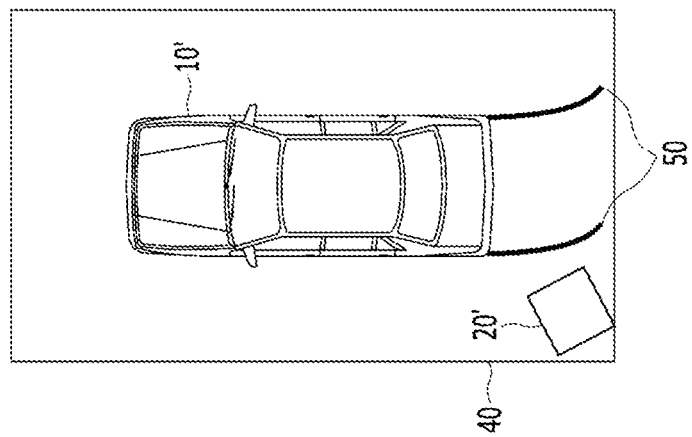
Figure 1A:
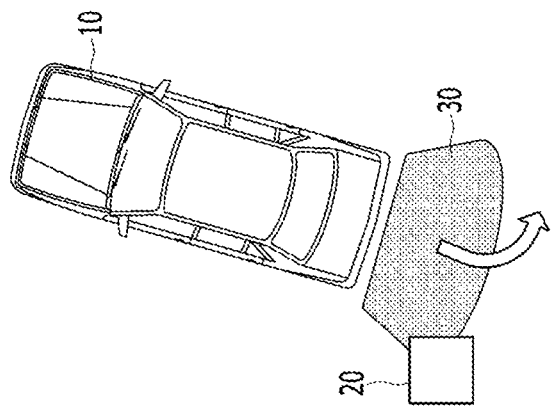
Figure 2:
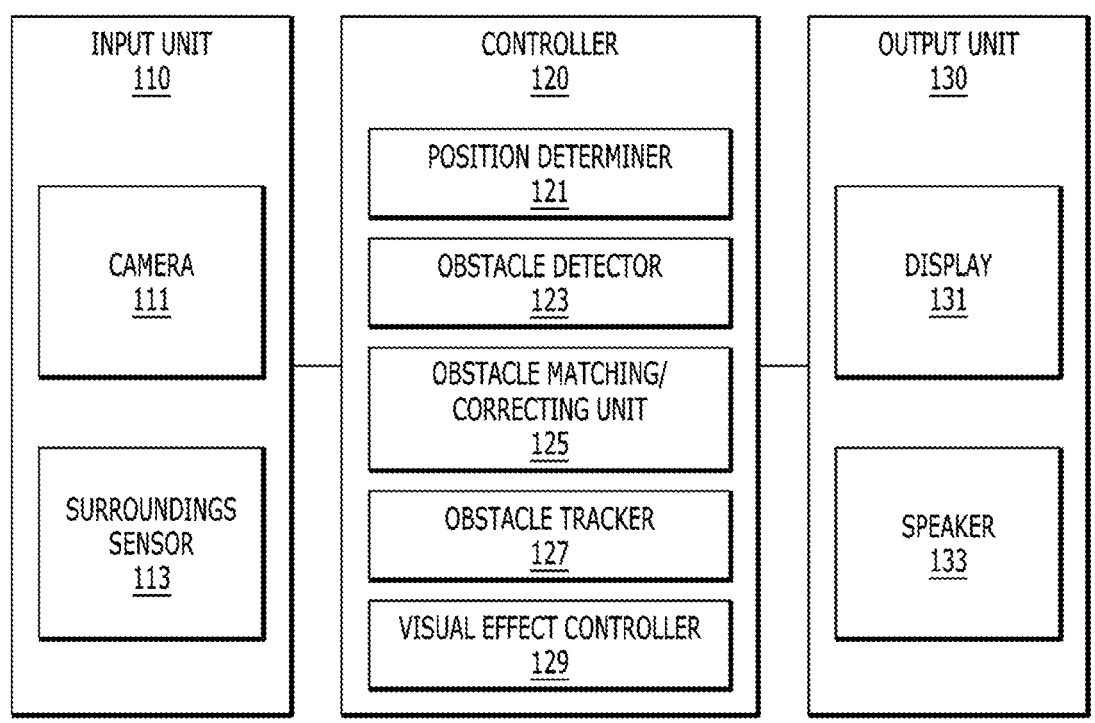
FIG. 2 is a block diagram showing an exemplary configuration of a surrounding information providing device for a vehicle in one form of the present disclosure.

FIG. 2 is a block diagram showing an exemplary configuration of a surrounding information providing device for a vehicle according to one form of the present disclosure.

Referring to FIG. 2, the surrounding information providing device may include: an input unit 110, which acquires information for sensing and tracking an obstacle around a vehicle, a controller 120, which processes information acquired through the input unit 110 to generate alarm information in response to detection and tracking of the position of the obstacle and vehicle proximity, and an output unit 130, which outputs various types of surrounding information and warning information. Hereinafter, each component will be described in detail.

The input unit 110 may include a camera 111 and a surroundings sensor 113.

The camera 111 may include a plurality of cameras, which constitute an SVM (AVM) system and capture omnidirectional images. For example, the camera 111 may include a front camera for taking a front view seen from the vehicle, a rear camera for taking a rear view seen from the vehicle, and two or more side cameras for taking left and right views seen from the vehicle. Each of the side cameras is mounted to a lower portion of a corresponding one of the left and right side mirrors. However, the present disclosure is not limited thereto.

The surroundings sensor 113 may include at least one of a plurality of ultrasonic sensors or a plurality of radars, which are mounted to at least one of the front portion, the front-side portion, the rear portion, or the rear-side portion of the vehicle in order to sense an obstacle located in the vicinity of a corresponding portion.

The controller 120 may include a position determiner 121, an obstacle detector 123, an obstacle matching/correcting unit 125, an obstacle tracker 127, and a visual effect controller 129.

The position determiner 121 may determine whether the current position of the vehicle is a position corresponding to activation of the function to enable a determination on whether to perform a waring function in response to detection and tracking of an obstacle and the trajectory of an exterior protruding part of the vehicle, whether to perform a general sensor warning, or whether to display an omnidirectional image. To this end, the position determiner 121 may receive information about the current position of the vehicle from a global positioning system (GPS). The position corresponding to activation of the function may be set in advance in the form of coordinates, or may be set in advance in the form of a category (e.g. a parking lot). Alternatively, the position determiner 121 may determine activation of the function based on a basic setting input by a driver, key button input, or a gear shift range (e.g. the R-range), regardless of the current position of the vehicle.

The obstacle detector 123 may detect the presence or absence of an obstacle and the position thereof based on the information input from the input unit 110. For example, the obstacle detector 123 may perform image-based obstacle detection through image processing such as, for example, edge detection from the omnidirectional image acquired through the camera 111, and sensor-information-based obstacle detection using the sensor information acquired through the surroundings sensor 113.

The obstacle matching/correcting unit 125 may match an obstacle detected through the image-based obstacle detection by the obstacle detector 123 with an obstacle detected through the sensor-information-based obstacle detection by the obstacle detector 123, and may determine that the obstacle detected through the image-based obstacle detection and the obstacle detected through the sensor-information-based obstacle detection are the same obstacle when these obstacles are located within a specific error range with respect to the vehicle. In addition, the obstacle matching/correcting unit 125 may correct the position of the matched obstacle. For example, the obstacle matching/correcting unit

125 may determine the position of the matched obstacle as an intermediate point between the image-based detection result and the sensor-information-based detection result, a point obtained by assigning a predetermined weighted value to any one result, or a point corresponding to any one result.

The obstacle tracker 127 may track the position of the matched obstacle while the matched obstacle is included in the omnidirectional image even when the matched obstacle is not detected any longer through sensor-based detection (that is, even when the matched obstacle gets out of the sensing range of the sensor due to travel of the vehicle). For example, in the case in which a pillar located in a lateral rearward space of the vehicle is detected both through the image-based obstacle detection and through the sensor-information-based obstacle detection and is managed as a matched obstacle, even when the pillar gets out of the sensing range of the sensor and is located in a lateral space of the vehicle due to travel of the vehicle, the obstacle tracker 127 may track the position of the pillar based on the travel distance and direction of the vehicle, whereby the distance between the pillar and the vehicle may be determined.

The visual effect controller 129 may synthesize images captured in respective directions by the camera 111, and may convert the same into an omnidirectional top-view image. In addition, the visual effect controller 129 may generate an image guide corresponding to the calculation/determination results of the obstacle detector 123, the obstacle matching/correcting unit 125, and the obstacle tracker 127, and may overlay the same on the omnidirectional image. For example, the visual effect controller 129 may generate an image guide corresponding to the position of the obstacle detected by the obstacle detector 123, and the generated image guide may be displayed on the omnidirectional image at a position corresponding to the position correction result of the obstacle matching/correcting unit 125.

Further, even when a specific obstacle is not sensed by the surroundings sensor 113 due to travel of the vehicle, the image guide related to the corresponding obstacle may be continuously displayed at a position corresponding to the tracking result of the obstacle tracker 127. In addition, the visual effect controller 129 may generate, in real time, image guides corresponding to an estimated trajectory of the vehicle and an estimated trajectory of an exterior part protruding from the vehicle body in response to the steering angle and forward/backward travel of the vehicle. Accordingly, when any one of the estimated trajectories overlaps the position of the detected obstacle, the visual effect controller 129 may output different types of warning image guides in response to proximity.

The output unit 130 may include a display 131 and a speaker 133. The display 131 may output an omnidirectional image including a guide image, and may be a display provided in a head unit or an audio/video/navigation (AVN) system. However, the present disclosure is not limited thereto. The speaker 133 may output a warning sound in response to approach of the vehicle body or an exterior part protruding from the vehicle body to the detected obstacle.

Hereinafter, a surrounding information providing process based on the above-described configuration of the device will be described with reference to FIG. 3.

Figure 3:
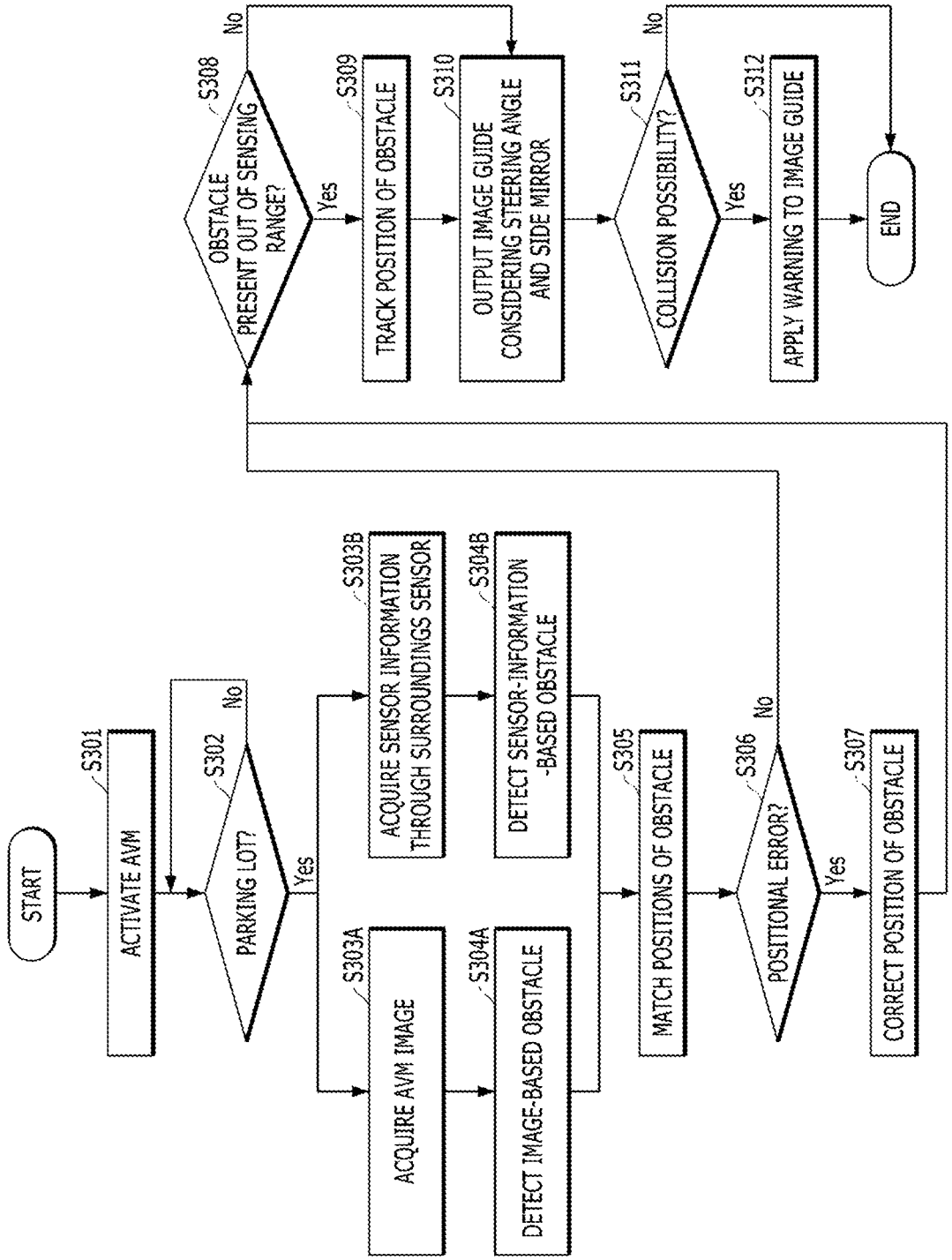
FIG. 3 is a flowchart showing an exemplary surrounding information providing process according to one form of the present disclosure.

FIG. 3 is a flowchart showing an exemplary surrounding information providing process in one form of the present disclosure.

Referring to FIG. 3, an omnidirectional image output function may be activated (S301). The activation of the omnidirectional image output function may mean activation of the AVM or SVM system. The omnidirectional image output function may be activated through manipulation of the AVM/SVM activation button or shift to the R-range.

The position determiner 121 may determine whether the current position of the vehicle corresponds to a predetermined region (e.g. a parking lot). Upon determining that the current position of the vehicle corresponds to a predetermined region, the position determiner 121 may perform an image guide providing function (S302). In some forms, this step may be omitted.

The obstacle detector 123 may perform image-based obstacle detection (S304A) using the image obtained through the camera 111 (S303A), and may perform sensor-information-based obstacle detection (S304B) using the sensor information obtained through the surroundings sensor 113 (S303B). At this time, as described above, the image-based obstacle detection (S304A) may use the edge detection scheme. However, the present disclosure is not limited thereto. As will be described later with reference to FIG. 7, it may be possible to detect an obstacle by specifying a portion that changes in shape according to travel of the vehicle. In addition, in the image-based obstacle detection (S304A), the distance from the vehicle may refer to information in which the pixel position in the omnidirectional image has been matched with the distance from the vehicle.

The obstacle matching/correcting unit 125 may match the position of the obstacle detected based on the image and the position of the obstacle detected based the sensor information with each other to determine whether the detected obstacles are the same obstacle (S305). When there is an error in the position of the same obstacle (Yes in S306), the position of the obstacle is corrected (S307). As described above, the position of the obstacle may be corrected through at least one of the mutual correction method, the weighted value assignment method, or the correction method using the position corresponding to any one of the two detection methods.

When there is no error in the position of the same obstacle (No in S306) or when the position is completely corrected (S307), the obstacle tracker 127 determines whether there is an obstacle present out of the sensing range of the surroundings sensor 113 due to travel of the vehicle (S308). When there is an obstacle present out of the sensing range (Yes in S308), the obstacle tracker 127 may track the position of the corresponding obstacle in response to travel of the vehicle (S309). As described above, the position of the corresponding obstacle may be continuously tracked until the distance between the corresponding obstacle and the vehicle exceeds a predetermined level (e.g. a distance included in the omnidirectional image).

The visual effect controller 129 may generate an image guide in consideration of the detected obstacle around the vehicle, the steering angle, and an exterior part (e.g. a side mirror) protruding from the vehicle body, and may output the image guide through the display 131 (S310). The visual effect controller 129 may take into consideration, among at least one obstacle detected by the obstacle detector 123, at least one of the position of the obstacle not matched by the obstacle matching/correcting unit 125, the corrected position of the obstacle matched by the obstacle matching/correcting unit 125, or the position of the obstacle that is being tracked by the obstacle tracker 127.

Based on the steering angle and travel of the vehicle, the visual effect controller 129 may determine the possibility of collision between at least one detected obstacle and each of the vehicle body and the exterior protruding part (S311). Upon determining that there is the possibility of collision (Yes in S311), the visual effect controller 129 may apply a visual warning effect to the image guide (S312). For example, the visual effect controller 129 may provide a visual effect in a form in which at least one of the color, shape, or repeated flashing of the image guide is controlled in response to the distance. However, the present disclosure is not limited thereto.

Hereinafter, the concrete form of the image guide according to the form will be described with reference to FIGS. 4 to 7.

FIGS. 4A and 4B show exemplary output forms of a guide image in some forms of the present disclosure. FIGS. 4A and 4B, and the drawings below show omnidirectional images output through the display 131, to which a guide image is applied.

Referring to FIG. 4A, a vehicle image 410 may be displayed in the middle of the display, and an omnidirectional image and an image guide overlaid thereon may be displayed around the vehicle image 410. A specific visual effect 430 may be applied as a type of image guide to at least an edge of an obstacle 420 detected through the surroundings sensor 113.

As shown in FIG. 4B, even when the obstacle 420 gets out of the sensing range of the surroundings sensor 113 due to travel of the vehicle, the position of the corresponding obstacle 420 may be tracked by the obstacle tracker 127, and accordingly the visual effect 430 may be displayed at a position corresponding to the position of the corresponding obstacle 420.

FIG. 5 shows another exemplary output form of a guide image according to one form of the present disclosure.

Referring to FIG. 5, an image of an obstacle 520 present around the vehicle 510 and a visual effect 550 corresponding to the detected position of the obstacle 520 may be applied to an omnidirectional image. In addition, when the gear shift range is the R-range, a guide image 530, which corresponds to an estimated travel trajectory of two rear wheels of the vehicle 510 from the current positions thereof in response to the steering angle, may be displayed. When the gear shift range is the D-range, the guide image 530 may be displayed so as to extend forwards from the current positions of two front wheels of the vehicle 510 in response to the steering angle.

In addition, in the omnidirectional image shown in FIG. 5, an image guide 540, which corresponds to an estimated trajectory of an exterior part protruding most from the vehicle body in the lateral direction, i.e. a side mirror 511, may also be displayed in response to the steering angle and the current gear shift range. When the image guide 540 corresponding to the estimated trajectory meets (overlaps or intersects) the detected position of the obstacle 520, at least one of the image guide 540 corresponding to the estimated trajectory of the side mirror 511 or the visual effect 550 corresponding to the detected position of the obstacle 520 may be modified to a form of warning (e.g. color change, repeated flashing, etc.).

FIGS. 6A, 6B, 6C and 6C show some exemplary output forms of a guide image in some forms of the present disclosure.

Unlike the output form of the guide image shown in FIG. 5, referring to FIGS. 6A-6D, different visual effects may be provided in response to distances. Specifically, referring to FIG. 6A, even when an estimated trajectory 640 of a side mirror 611 meets an obstacle 620, if the spacing distance therebetween is greater than or equal to a predetermined distance, the estimated trajectory 640 may be displayed in a predetermined first color (e.g. yellow).

As shown in FIG. 6B, even when the obstacle 620 gets out of the sensing range of the surroundings sensor 113 due to travel of the vehicle, the position of the obstacle and the position of the edge thereof may be continuously tracked by the obstacle tracker 127. When the distance between the side mirror 611 and the edge of the obstacle becomes equal to or less than a predetermined first distance, an estimated trajectory 640' of the side mirror 611 may be changed to a predetermined second color (e.g. orange), and a visual effect 650 may be displayed at a position corresponding to the position of the edge of the obstacle 620.

Subsequently, as shown in FIG. 6C, when the vehicle moves further backwards and thus the distance between the side mirror 611 and the edge of the obstacle becomes equal to or less than a second distance, which is shorter than the first distance, an estimated trajectory 640" of the side mirror 611 may be changed to a predetermined third color (e.g. red), and a visual effect 650' applied to the edge of the obstacle 620 may also be changed to another color indicating a higher level of warning.

As described above with reference to FIGS. 6A to 6C, the visual effect applied to the estimated trajectory is changed in response to the actual change in the distance between the obstacle 620 and the side mirror 611. However, as shown in FIG. 6D, even when the side mirror 611 does not actually approach to the obstacle 620, different visual effects may be applied to the estimated trajectory according to the distance therebetween. That is, when the estimated trajectory overlaps the obstacle, the visual effect may be applied to the estimated trajectory such that at least one of the color or the shape of the estimated trajectory is changed by stages according to the distance (e.g. color change, color gradation, etc.).

As shown in FIGS. 6A-6D, when there is no possibility of collision between the vehicle body and the obstacle 620, the estimated trajectory 630 of the vehicle body is maintained in a single form. However, when there is the possibility of collision between the vehicle body and the obstacle 620, a visual effect may be applied to the estimated trajectory 630 of the vehicle body or may be changed according to the distance in a manner similar to that applied to the estimated trajectory 640 of the side mirror 611.

FIGS. 7A and 7B are views respectively showing a pillar sensing principle according to one form of the present disclosure.

Referring to FIG. 7A, in the case of a three-dimensional obstacle such as a pillar 720, a bottom surface 723 and one or more surfaces 721 and 722 extending from the bottom surface 723 are detected. As shown in FIG. 7B, since the position of the pillar 720 relative to the camera changes due to travel of the vehicle, the shapes of the respective surfaces 721' and 722' change. For example, when the vehicle travels backwards, the angle between the diagonal component of each of the surfaces 721 and 722 and the bottom surface 723 gradually decreases. However, the shape of the bottom surface 723 hardly changes. Thus, when performing the image-based obstacle detection, the obstacle detector 123 may recognize a combination of an unchanged portion and a changed portion, which extends from the unchanged portion and changes in angle and shape according to travel of the vehicle, as a three-dimensional obstacle. Therefore, it is possible to filter a portion, which is not an actual obstacle, such as a parking line, but is detected through the edge detection.

Although the method of providing surrounding information according to the form has been described above on the basis of a parking situation, the present disclosure is not limited thereto. For example, the method of providing surrounding information according to the form may be applied to protect a side mirror when driving on a narrow alleyway, or may be applied to a remote parking or automatic parking function.

For example, when a remote parking or automatic parking function is performed, particularly during parking-out, there may occur a case in which automatic parking-out is impossible due to detection of an obstacle present near the vehicle by the surroundings sensor 113. However, when the image-based obstacle detection through the camera 111 is applied together, it is possible to additionally determine whether the obstacle is located close enough to collide with the vehicle. Thus, the parking-out may be possible regardless of the detection result of the surroundings sensor 113.

In addition, in the above-described forms, the visual warning has been mainly described, but the present disclosure is not limited thereto. The present disclosure may also be applied to acoustic warning through the speaker 133. For example, when the vehicle approaches to an obstacle or when there is the possibility of collision between the side mirror and the obstacle due to travel of the vehicle, different types of warning sounds may be output in response to the risk of collision. For example, the volume of the warning sound or the frequency of outputting the warning sound may be increased in response to proximity.

In addition, although the forms have been described above on the basis of a situation in which the vehicle travels backwards, the present disclosure is not limited thereto, and it will be apparent to those skilled in the art that the present disclosure can also be applied to a situation in which the vehicle travels forwards.

The present disclosure may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, and an optical data storage.

Also, the terms, such as 'unit' or 'module', etc., should be understood as a unit that processes at least one function or operation and that may be embodied in a hardware manner (e.g., a processor), a software manner, or a combination of the hardware manner and the software manner.

As is apparent from the above description, a vehicle and a method of providing surrounding information thereof according to at least one form of the present disclosure configured as described above may more effectively provide a driver with information about surrounding obstacles.

In particular, an estimated trajectory of an exterior part protruding from a vehicle body is considered, and the positions of an obstacle, which are obtained through different methods, are mutually corrected, thereby exhibiting an improved collision prevention effect.

However, the effects achievable through the disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the disclosure set forth herein.

What is claimed is:

1. A method for providing surrounding information of a vehicle, the method comprising:
    detecting, by a surroundings sensor of the vehicle, surroundings around the vehicle and obtaining at least one sensor-based obstacle using sensor detection information acquired from the surroundings sensor;
    detecting, by a plurality of cameras of the vehicle, the surroundings around the vehicle and obtaining at least one image-based obstacle using an image acquired from the plurality of cameras;
    determining, by a controller of the vehicle, at least one matched obstacle, which is a match between the at least one sensor-based obstacle and the at least one image-based obstacle;
    correcting, by the controller, a position of the at least one matched obstacle using at least one of the at least one sensor-based obstacle or the at least one image-based obstacle corresponding to the at least one matched obstacle;
    changing, by the controller, at least one of a color or a shape of a visual effect based on a distance to the obstacle which is overlapping at least one of a first trajectory or a second trajectory; and
    outputting, by the controller, warning information comprising the visual effect,
    wherein the visual effect is overlaid on an omnidirectional image constituted by images acquired through the plurality of cameras.

2. The method according to claim 1, further comprising, when the at least one sensor-based obstacle is out of a sensing range of the surroundings sensor, tracking, by an obstacle tracker, a position of the at least one sensor-based obstacle based on a travel distance and a direction of the vehicle.

3. The method according to claim 2, wherein the tracking is performed while the position of the at least one sensor-based obstacle is within a predetermined distance from the vehicle.

4. The method according to claim 2, further comprising:
    determining, by the controller, whether a position of each of the at least one sensor-based obstacle, the at least one image-based obstacle, the at least one sensor-based obstacle subjected to the position tracking, and the at least one matched obstacle subjected to a position correction overlaps the first trajectory corresponding to an estimated travel trajectory of a vehicle body and the second trajectory corresponding to an estimated travel trajectory of an exterior part protruding from the vehicle body.

5. The method according to claim 4, wherein the exterior part protruding from the vehicle body comprises a side mirror.

6. The method according to claim 4, further comprising, when an obstacle overlaps at least one of the first trajectory or the second trajectory, outputting, by the controller, the warning information based on the distance to the obstacle from the vehicle.

7. The method according to claim 1, wherein detecting the at least one sensor-based obstacle comprises:
    performing edge detection with the image acquired through the plurality of cameras; and detecting at least one three-dimensional obstacle based on a degree of change in a shape and a degree of change in diagonal angle in response to travel of the vehicle from at least one candidate obstacle detected through the edge detection.

8. A non-transitory computer-readable recording medium having a program recorded thereon, the program configured to cause a processor of a vehicle to perform acts of:
- detecting, by a surroundings sensor of the vehicle, surroundings around the vehicle and obtaining at least one sensor-based obstacle using sensor detection information acquired from the surroundings sensor;
- detecting, by a plurality of cameras of the vehicle, the surroundings around the vehicle and obtaining at least one image-based obstacle using an image acquired from the plurality of cameras;
- determining, by a controller of the vehicle, at least one matched obstacle, which is a match between the at least one sensor-based obstacle and the at least one image-based obstacle;
- correcting, by the controller, a position of the at least one matched obstacle using at least one of the at least one sensor-based obstacle or the at least one image-based obstacle corresponding to the at least one matched obstacle;
- changing, by the controller, at least one of a color or a shape of a visual effect based on a distance to the obstacle which is overlapping at least one of a first trajectory or a second trajectory; and
- outputting, by the controller, warning information comprising the visual effect,
- wherein the visual effect is overlaid on an omnidirectional image constituted by images acquired through the plurality of cameras.

9. A vehicle comprising:
- an input unit comprising a surroundings sensor and a plurality of cameras;
- a controller configured to detect and track at least one surrounding obstacle based on information acquired through the input unit; and
- an output unit configured to output warning information based on a distance from the vehicle to the at least one surrounding obstacle detected and tracked by the controller,
- wherein the controller comprises:
  - an obstacle detector configured to:
    - detect surroundings around the vehicle,
    - obtain at least one sensor-based obstacle using sensor detection information acquired through the surroundings sensor,
    - detect the surroundings of the vehicle, and
    - obtain at least one image-based obstacle using an image acquired through the plurality of cameras;
  - an obstacle matching and correcting unit configured to:
    - determine at least one matched obstacle, which is a match between the at least one sensor-based obstacle and the at least one image-based obstacle, and
    - correct a position of the at least one matched obstacle using at least one of the at least one sensor-based obstacle or the at least one image-based obstacle corresponding to the at least one matched obstacle; and
  - a visual effect controller configured to:
    - control the visual effect,
    - change at least one of a color or a shape of the visual effect based on the distance to the obstacle which is overlapping at least one of a first trajectory or a second trajectory, and
    - output warning information comprising the visual effect,
    - wherein the visual effect is overlaid on an omnidirectional image constituted by images acquired through the plurality of cameras.

10. The vehicle according to claim 9, wherein the controller further comprises:
- an obstacle tracker, wherein, when the at least one sensor-based obstacle is out of a sensing range of the surroundings sensor, the obstacle tracker is configured to track a position of the at least one sensor-based obstacle based on a travel distance and a direction of the vehicle.

11. The vehicle according to claim 10, wherein the obstacle tracker is configured to track the position of the at least one sensor-based obstacle when the at least one sensor-based obstacle is within a predetermined distance from the vehicle.

12. The vehicle according to claim 10, wherein the controller is configured to determine whether a position of each of the at least one sensor-based obstacle, the at least one image-based obstacle, the at least one sensor-based obstacle subjected to the position tracking, and the at least one matched obstacle subjected to a position correction overlaps the first trajectory corresponding to an estimated travel trajectory of a vehicle body and the second trajectory corresponding to an estimated travel trajectory of an exterior part protruding from the vehicle body.

13. The vehicle according to claim 12, wherein the exterior part protruding from the vehicle body comprises a side mirror.

14. The vehicle according to claim 12, wherein, when an obstacle overlaps at least one of the first trajectory or the second trajectory, the controller is configured to output the warning information through the output unit in response to the distance to the obstacle.

15. The vehicle according to claim 9, wherein the obstacle detector is configured to: perform edge detection with the image acquired through the plurality of cameras, and detect at least one three-dimensional obstacle based on a degree of change in a shape and a degree of change in a diagonal angle in response to travel of the vehicle from at least one candidate obstacle detected through the edge detection.

* * * * *